United States Patent [19]

Edelman et al.

[11] Patent Number: 5,401,779
[45] Date of Patent: Mar. 28, 1995

[54] THERMOTROPIC LIQUID CRYSTALLINE POLYMER REINFORCED WITH POLYIMIDE SIZED CARBON FIBERS

[76] Inventors: Robert Edelman, 173 Ravenhurst Ave., Staten Island, Richmond County, N.Y. 10314; Richard D. Orwoll, 870 Standish Ave., Mountainside, Union County, N.J. 07092

[21] Appl. No.: 458,076

[22] Filed: Jan. 14, 1983

[51] Int. Cl.$^6$ .............. C09K 19/00; C09K 19/52; C08K 9/00
[52] U.S. Cl. .................. 252/299.01; 428/1; 523/205; 523/207
[58] Field of Search ........... 523/205, 207; 428/1, 428/902; 252/299.01

[56] References Cited

U.S. PATENT DOCUMENTS

| | | | |
|---|---|---|---|
| 4,140,016 | 2/1979 | Fergason | 428/1 |
| 4,272,346 | 6/1981 | Jakubowski et al. | 204/181 R |
| 4,381,886 | 5/1983 | Yokokura et al. | 428/1 |

FOREIGN PATENT DOCUMENTS

| | | |
|---|---|---|
| 0069492 | 1/1983 | European Pat. Off. . |
| 0106752 | 9/1978 | Japan ............... 523/205 |

OTHER PUBLICATIONS

Derwent Abst. 86770 A/48 (Oct. 1978) "Carbon Fibres Coated with Polyimide Resin (prepolymer) . . . " Toho Belson KK.

*Primary Examiner*—Shean Wu

[57] ABSTRACT

A thermotropic liquid crystalline polymer matrix having sized carbon fibers incorporated therein for reinforcement. The carbon fibers are coated on their surface with a sizing composition comprising a rigid polyimide coating which is derived from the reaction of at least one aromatic diamine, at least one dianhydride, and at least one aromatic tetracarboxylic acid diester in which the carboxylic acid groups and ester groups are ortho disposed. By the use of appropriate amounts of heat and pressure, multifilamentary bundles of carbon fibers are readily impregnated with thermotropic liquid crystalline polymer to form a prepreg having a uniform distribution of carbon fiber throughout.

40 Claims, No Drawings

THERMOTROPIC LIQUID CRYSTALLINE POLYMER REINFORCED WITH POLYIMIDE SIZED CARBON FIBERS

BACKGROUND OF THE INVENTION

1. Field of the Invention

The present invention relates to carbon fiber reinforced thermotropic liquid crystalline polymers, and more particularly, to the production of prepregs and composites from such reinforced thermotropic liquid crystalline polymers.

2. Description of the Prior Art

Structural composites made from continuous carbon fibers and thermoset resins are well-known in the prior art. Thermoset resins are low in viscosity and thus are readily used to impregnate fiber tows to form a useful intermediate product form which is called a prepreg. Such a prepreg has tack so that plies can readily adhere to one another, and drape so that parts with various shapes can be prepared. After being cured, such thermosets provide good elevated temperature performance, chemical and solvent resistance, and high dimensional stability. However, thermoset resins also have several disadvantages which include: long cure times, a need for refrigeration since they advance significantly at room temperature, a very brittle nature after curing, and an inability to use scrap since the cured thermosets are infusible.

In contrast, thermoplastic resins have several advantages over thermoset resins when used with carbon fibers. They exhibit excellent impact strength, can be formed quickly without the need for a curing process, need no refrigeration, and the scrap can be reused. In addition, thermotropic liquid crystalline polymers, a particular type of thermoplastic resin, has good solvent resistance and creep resistance, as well as good elevated temperature performance.

Prior to the present invention, obtaining such a structural composite has been difficult due to the relatively high viscosity of such resins, even at elevated temperature, which makes it difficult to properly impregnate a carbon fiber bundle. In addition, the sizing agents of the prior art form a moderately stiff coating and have a very limited stability at the temperature necessary to achieve an acceptable thermoplastic viscosity to facilitate fiber impregnation.

In the prior art, various procedures have been described for the impregnation of fibers by the use of a solution of thermoplastic. However, these procedures are undesirable because of the problems associated with solvent handling such as flammability and toxicity, and because of the need for scrupulous solvent removal from the intermediate product form to avoid deterioration of mechanical properties at elevated temperatures which can result from plasticization or voids.

Accordingly, a need exists for a thermoplastic resin reinforced with carbon fibers which exhibits excellent impact strength, can be formed readily without the need for a curing process, needs no refrigeration, has good solvent resistance and creep resistance, as well as good elevated temperature performance, and which is readily manufactured with a relatively uniform distribution of reinforcing fibers throughout the resin matrix.

SUMMARY OF THE INVENTION

The present invention comprises a thermotropic liquid crystalline polymer matrix having carbon fibers incorporated therein for reinforcement. The carbon fibers are coated on their surface with a sizing composition which cures to comprise a rigid polyimide coating which is derived from the reaction of at least one aromatic diamine, at least one dianhydride, and at least one aromatic tetracarboxylic acid diester in which the carboxylic acid groups and ester-groups are ortho disposed. This oligomeric polyamic acid forms a relatively soft coating on the carbon fibers so that impregnation of the fiber bundles with the liquid crystalline polymer melt can occur. After a brief exposure to elevated temperature, the polyamic acid sizing agent is converted to a polyimide which has excellent high temperature resistance. By the use of appropriate amounts of heat and pressure, multifilamentary bundles of carbon fibers are readily impregnated with thermotropic liquid crystalline polymer to form a prepreg.

In a preferred embodiment, the coated bundles are passed through a pressurized crosshead die which forces molten liquid crystalline polymer from an extruder into the carbon fiber bundles. The resulting article has a uniform distribution of carbon fiber throughout, with very little of the structure seen in the original bundle being observed. The resulting tape has an acceptable degree of drapeability.

The resulting prepreg can be cut to an appropriate shape, placed together in any desired number of plies, and then put in a mold wherein the temperature of the plies is raised to at or above the melting temperature of the thermotropic liquid crystalline polymer, after which pressure is applied to form a composite part. The formed composite part is cooled under pressure and removed from the mold after the part has cooled below the melt temperature of the matrix.

DETAILED DESCRIPTION OF THE INVENTION

The carbon fibers which are used in the present invention are provided with a protective size coating, the preparation of the size and its application being described in commonly assigned U.S. Ser. No. 276,108 filed Jun. 22, 1981, now U.S. Pat. No. 4,394,467, incorporated herein by reference. The carbon fibers contain at least 90 percent carbon by weight (e.g., at least 95 percent carbon by weight in preferred embodiments) and such carbon may be either amorphous or graphitic in nature. Suitable carbon fibers are commercially available and commonly are of a relatively low denier per filament of approximately 0.5 to 2 thereby rendering them susceptible to damage during handling in the absence of a satisfactory size coating, particularly if the fibers also possess a relatively high Young's modulus. Representative carbon fibers are disclosed in commonly assigned U.S. Pat. Nos. 3,775,520; 3,900,556, 3,925,524; and 3,954,950.

The carbon fibers prior to sizing may optionally have their surface characteristics modified so as to improve their ability to bond to a resinous matrix material. Representative surface modification processes are disclosed in U.S. Pat. Nos. 3,657,082; 3,671,411; 3,723,150; 3,723,607; 3,754,957; 3,759,805; 3,859,187; 3,894,884; and in commonly assigned U.S. Ser. No. 222,790, now U.S. Pat. No. 4,374,114, filed Jan. 5, 1981.

The carbon fibers prior to sizing are preferably provided as a multifilamentary fibrous material such as a continuous length of a multifilamentary yarn, tow, strand, tape, etc. However, staple carbon fibers or other fibrous assemblages may also be satisfactorily sized. For best results the configuration of the carbon fibers is such that the surfaces of the individual fibers are substantially exposed when the size composition is applied.

The size composition which forms a flexible size on the surface of the carbon fibers comprises a film-forming polyamic acid oligomer and is capable of yielding a rigid polyimide at elevated temperatures which is derived from the reaction of (1) at least one aromatic diamine, (2) at least one aromatic dianhydride, (3) and at least one aromatic tetracarboxylic acid diester in which the carboxylic acid groups and ester groups are ortho disposed, wherein the polyamic acid oligomer is an intermediate in the formation of the rigid polyimide. The polyamic acid oligomer alternatively can be termed a polyamide acid oligomer.

Representative aromatic diamines are p-phenylenediamine, m-phenylenediamine, 4,4'-oxydianiline, 4,4'-methylenedianiline, 4,4'-diaminodiphenylsulfone, 4,4'-diaminobenzophenone, 4,4'-diaminobiphenyl, 3,3'-diaminodiphenylsulfone, 3,3'-diaminobenzophenone, and mixtures thereof. Particularly satisfactory results are obtained when a mixture of approximately 95 percent by weight of p-phenylenediamine and approximately 5 percent by weight of m-phenylenediamine is selected. The aromatic diamine reactant preferably is provided in a concentration of approximately 50 mole percent based upon the total concentration of the three classes of reactants.

Representative aromatic dianhydrides are 3,3',4,4'-benzophenonetetracarboxylic dianhydride, pyromellitic dianhydride, 3,3',4 4'-(hexafluoroisopropylidene)-bis(phthalic anhydride), and mixtures thereof. Particularly satisfactory results are obtained when 3,3',4 4'-benzophenonetetracarboxylic dianhydride is selected. The aromatic dianhydride reactant preferably is provided in a concentration of approximately 30 to 40 mole percent based upon the total concentration of the three classes of reactants, and most preferably in a cencentration of approximately 35 mole percent based upon the total concentration of the three classes of reactants. The aromatic dianhydride is capable of undergoing an immediate reaction with the aromatic diamine even at ambient conditions to yield a polyamic acid oligomer. Other polyimide-forming reactants such as aromatic tetracarboxylic acids and aromatic diester diacids are substantially incapable of undergoing such reaction with the aromatic diamine to form the desired film-forming polyamic acid oligomer. The formation of the film-forming polyamic acid oligomer continues during the application of the size while the size composition is heated while present on the carbon fibers at moderate temperatures, e.g. at approximately 150° C. for approximately 2 minutes as described hereafter.

The aromatic tetracarboxylic acid diester may be formed by known techniques through the reaction of an aromatic dianhydride with an alcohol having 1 to 6 carbon atoms. Representative alcohols for this reaction are methyl alcohol, ethyl alcohol, n-propyl alcohol, isopropyl alcohol, isobutyl alcohol, n-amyl alcohol, hexyl alcohol, etc. The preferred alcohol for use when forming the aromatic tetracarboxylic acid diester is ethyl alcohol.

Representative aromatic tetracarboxylic acid diesters are 3,3'-diethylester of 3,3',4,4'-benzophenonetetracarboxylic acid, 3,3'-diethylester of 3,3',4,4'-(hexafluoroisopropylidene) bis(phthalic acid), 1,5-diethylester of pyromellitic acid, and mixtures thereof. Particularly satisfactory results are obtained when the 3,3'-diethylester of 3,3',4,4'-benzophenonetetracarboxylic acid is selected. The aromatic tetracarboxylic acid diester preferably is provided in a concentration of approximately 10 to 20 mole percent based upon the total concentration of the three classes of reactants, and most preferably in a concentration of approximately 15 mole percent based upon the total concentration of the three classes of reactants. The aromatic tetracarboxylic acid diester undergoes only minimal reaction with the aromatic diamine while the coating on the carbon fibers is serving its function as a flexible size. It is only upon heating at more elevated temperatures that the aromatic tetracarboxylic acid diester enters into the polyimide-forming reaction. While present in the size the aromatic tetracarboxylic acid diester beneficially contributes to the desirable properties exhibited by maintaining size flexibility by controlling the development of the desired polyamic acid oligomer. Since this material serves as a reactive diluent, it does not diminish the ultimate cured properties of a polyimide composite because it will react with the other components to form a polyimide during the composite cure cycle. If the aromatic tetracarboxylic acid diester is omitted from the size composition and molar concentration of the aromatic dianhydride correspondingly is increased, then the reaction between these two polyamic acid-forming reactants is too extreme and tends to greatly diminish the desired flexibility of the size composition when present upon the carbon fibers at moderate temperatures. The resulting stiffness of the carbon fiber bundles then prevents adequate wetting of the fibers during resin impregnation.

The flexible size coating preferably is applied to the carbon fibers when dissolved in a polar solvent which is incapable of harming the carbon fibers. Representative solvents for the reactants and resulting polyamic acid are N-methyl pyrrolidone, dimethylformamide, dimethylacetamide, dimethylsulfoxide, etc. Such solvents tend to be relatively high boiling (e.g., have a boiling point above approximately 150° C.). In a preferred embodiment a relatively volatile solvent (e.g., having a boiling point below approximately 70° C.) additionally is also present and is believed to aid in the removal of the polar solvent following contact of the carbon fibers with the dissolved reactants which are capable of forming the desired size. The preferred polar solvent for the reactants is N-methyl pyrrolidone and the preferred volatile solvent is acetone. Particularly satisfactory results are achieved when approximately 30 percent by weight of the solvent mixture is N-methyl pyrrolidone and approximately 70 percent by weight of the solvent mixture is acetone. The total concentration of the reactants present in the solvent mixture when initially contacted with the carbon fibers preferably is approximately 0.6 to 10 percent by weight based upon the total weight of the solution.

The solution which is capable of forming the flexible size coating may be applied to the carbon fibers by any suitable technique such as dipping, padding, etc. The solution preferably is provided at a temperature of approximately room temperature (e.g. approximately 25° C.) when applied to the carbon fibers. Once the solution is applied, the solvent is substantially volatilized by heating in an appropriate zone which is provided at a more highly elevated temperature. The temperature of such zone will be influenced by the boiling point of the polar solvent selected and preferably does not exceed approximately 150° to 160° C. Heating times of approximately 2 minutes have been found to be satisfactory. Appropriate equipment and safety precautions must be taken to insure the safety of personnel in the area and to effectively deal with the explosion hazard created by solvent vapors. Every effort is made to remove the solvent to the fullest extent possible; however, a minor amount of N-methyl pyrrolidone will still be present in the size composition following such heating.

Upon volatilization of the solvent the size coating is deposited upon the surface of the carbon fiber in a concentration of approximately 0.3 to 5.0 percent by weight based upon the weight of the carbon fiber, and most preferably in a concentration of 0.5 to 1.3 percent by weight based upon the weight of the carbon fiber.

In a preferred embodiment the flexible coating on the surface of the carbon fiber comprises a polyamic acid oligomer, and is capable of yielding a rigid polyimide at more highly elevated temperatures which is derived from the reaction of approximately 47.5 mole percent of p-phenylenediamine, approximately 2.5 mole percent of m-phenylenediamine, approximately 35 mole percent of 3,3',4,4'-benzophenonetetracarboxylic dianhydride, and approximately 15 mole percent of 3,3'-diethylester of 3,3',4,4'-benzophenonetetracarboxylic acid. The polyamic acid oligomer in this instance is formed primarily upon the reaction of the p-phenylenediamine, the m-phenylenediamine, and the benzophenonetetracarboxylic dianhydride to form an oligomer of the following general formula wherein the corresponding moieties derived from m-phenylenediamine are not shown for simplicity of illustration:

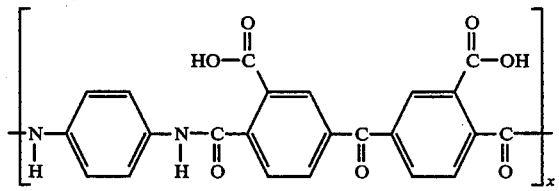

where x is a small number, e.g., approximately 2 to 10, or more.

The carbon fiber bearing the flexible size coating may be handled without undue damage. The fuzz problem which commonly exists when one attempts to process continuous lengths of unsized carbon fibers is significantly reduced. Also, bundles of carbon fibers bearing the size coating are amenable to flattening and spreading thereby facilitating ready impregnation of the same by the liquid crystalline polymer during the formation of a composite structure. Additionally the size coating is capable of withstanding the elevated temperatures for the melt processing of a liquid crystalline polymer matrix resin (e.g., 250° to 400° C.).

At the higher temperatures encountered during the formation of a composite article, the flexible size coating is transformed into a solid polyimide through the reaction of all of the reactants.

Representative classes of polymers from which the thermotropic liquid crystalline polymer suitable for use in the present invention may be selected include wholly aromatic polyesters, aromatic-aliphatic polyesters, wholly aromatic poly (ester-amides), aromatic-aliphatic poly(ester-amides), aromatic polyazomethines, aromatic polyester-carbonates, and mixtures of the same. In preferred embodiments the thermotropic liquid crystalline polymer is a wholly aromatic polyester, a wholly aromatic poly(ester-amide), or an aromatic-aliphatic poly(ester-amide). In such wholly aromatic polyester and wholly aromatic poly(ester-amide) each moiety present within the polymer chain contributes at least one aromatic ring. Also, it is preferred that naphthalene moieties be included in the thermotropic liquid crystalline polymer, e.g., 6-oxy-2-naphthoyl moiety, 2,6-dioxynaphthalene moiety, or 2,6-dicarboxynaphthalene moiety, in a concentration of not less than about 10 mole percent. The particularly preferred naphthalene moiety for inclusion in the thermotropic liquid crystalline polymer is the 6-oxy-2-naphthoyl moiety in a concentration of not less than about 10 mole percent.

Representative wholly aromatic polyesters which exhibit thermotropic liquid crystalline properties include those disclosed in the following United States Patents which are herein incorporated by reference: U.S. Pat. Nos. 3,991,013; 3,991,014; 4,066,620; 4,067,852; 4,075,262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,265,802; 4,267,304; 4,269,965; 4,279,803; 4,299,756; 4,294,955; 4,318,841; 4,337,190; and 4,337,191; and 4,355,134. As discussed hereafter the wholly aromatic polyesters of U.S. Pat. Nos. 4,161,470 and 4,256,624 are particularly preferred for use in the present invention.

Representative aromatic-aliphatic polyesters which exhibit thermotropic liquid crystalline properties are copolymers of polyethylene terephthalate and hydroxybenzoic acid as disclosed in *Polyester X-7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1–4. A further disclosure of such copolymers can be found in "Liquid Crystal Polymers: I Preparation and Properties of p-Hydroxybenzoic Acid Copolymers, *Journal of Polymer Science, Polymer Chemistry Edition*, Vol. 14, pages 2043 to 2058 (1976), by W. J. Jackson, Jr. and H. F. Kuhfuss. See also U.S. Pat. No. 4,138,842 and commonly assigned U.S. Ser. No. 287,345, filed Jul. 27, 1981 which are herein incorporated by reference.

Representative wholly aromatic and aromatic-aliphatic poly(ester-amides) which exhibit thermotropic liquid crystalline properties are disclosed in U.S. Pat. Nos. 4,272,625; 4,330,457; 4,339,375; 4,341,688; 4,351,917; 4;351,918; and 4,355,132. As discussed hereafter the poly(ester-amide) of U.S. Pat. No. 4,330,457 is particularly preferred for use in the present invention.

Representative aromatic polyazomethines which exhibit thermotropic liquid crystalline properties are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly (nitrilo-2-methyl-1,4-phenylenenitriloethylidyne-1,4-phenyleneethylidyne); poly(nitrilo-2-methyl-1,4-phenylenenitrilomethylidyne-1,4-phenylene-methylidyne); and poly(nitrilo-2-chloro-1,4-phenylenenitrilomethylidyne-1,4-phenylenemethylidyne).

Representative aromatic polyester-carbonates which exhibit thermotropic liquid crystalline properties are disclosed in U.S. Pat. Nos. 4,107,143, and 4,284,757, and in commonly assigned U.S. Ser. No. 319,024, filed Nov. 6, 1981, which are herein incorporated by reference. Examples of such polymers include those consisting essentially of p-oxybenzoyl units, p-dioxyphenyl units, dioxycarbonyl units, and terephthoyl units.

A thermotropic liquid crystalline polymer commonly is selected for use in the present invention which possesses a melting temperature within the range that is amenable to melt extrusion while employing commercially available equipment. For instance, thermotropic liquid crystalline polymers only are selected which exhibit a melting temperature somewhere within the range of approximately 250° to 400° C.

The thermotropic liquid crystalline polymer selected preferably also exhibits an inherent viscosity of at least 1.0 dl./g. when dissolved in a concentration of 0.1 percent by weight in pentafluorophenol at 60° C. (e.g., an inherent vicosity of approximately 2.0 to 15.0 dl./g.).

A particularly preferred wholly aromatic polyester for use in the present invention is that disclosed in U.S. Pat. No. 4,161,470 which is capable of forming an anisotropic melt phase at a temperature below approximately 350° C. This polyester consists essentially of the recurring moieties I and II wherein:

I is

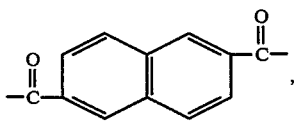

and
II is

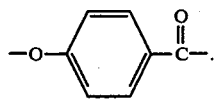

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 73 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. Such polymer preferably has an inherent viscosity of approximately 3.5 to 10 dl./g. when dissolved in a concentration of 0.1 percent by weight of pentafluorophenol at 60° C.

Another particularly preferred wholly aromatic polyester for use in the present invention is that disclosed in U.S. Pat. No. 4,256,624 which is capable of forming an anisotropic melt phase at a temperature below approximately 400° C. This polyester consists essentially of the recurring moieties I, II, and III which may include substitution of at least some of the hydrogen atoms present upon an aromatic ring wherein:

I is

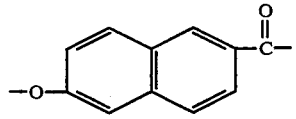

II is a dioxy aryl moiety of the formula —O—Ar—O— where Ar is a divalent radical comprising at least one aromatic ring, and III is a dicarboxy aryl moiety of the formula

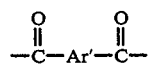

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, a phenyl group and mixtures of the foregoing, and wherein said polyester comprises approximately 10 to 90 mole percent of moiety I, approximately 5 to 45 mole percent of moiety II, and approximately 5 to 45 mole percent of moiety III.

A particularly preferred wholly aromatic poly(ester-amide) or aromatic-aliphatic poly(ester-amide) for use in the present invention is disclosed in U.S. Pat. No. 4,330,457, which is capable of forming an anisotropic melt phase at a temperature below approximately 400° C. The poly(ester-amide)s there disclosed consist essentially of recurring moieties I, II, III, and, optionally, IV wherein:

I is

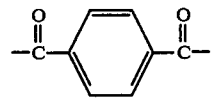

II is

where A is a divalent radical comprising at least one aromatic ring or a divalent trans-1,4-cyclohexylene radical;

III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of alkyl group of 1 to 4 carbon atoms, an alkoxy group of 1 to 4 carbon atoms, halogen, phenyl, substituted phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. The preferred dicarboxy aryl moiety II is:

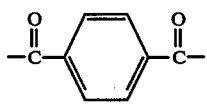

the preferred moiety III is:

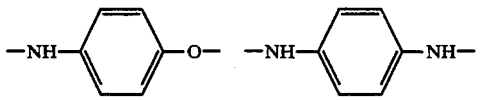

and the preferred dioxy aryl moiety IV is:

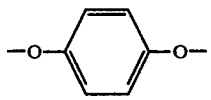

Such polymer preferably has an inherent viscosity of approximately 2.0 to 10 dl./g. when dissolved in a concentration of 0.1 percent by weight in pentafluorophenol at 60° C.

Although the sizing agent used on the carbon fibers facilitates the impregnation of the multifilamentary bundles with thermotropic liquid crystalline polymer, this impregnation is even more readily accomplished by the addition of pressure.

A preferred means for accomplishing the impregnation of the multifilamentary bundles is passing the bundles through a pressurized crosshead die which forces molten thermotropic liquid crystalline polymer from an extruder into the carbon fiber bundles. The crosshead die can be designed to provide a molten pool of polymer through which carbon fiber can be drawn either vertically or horizontally. Such a process is referred to in the art as pultrusion. The use of a pultrusion process is well known in the prior art and is analogous to a wire coating process.

Any of the commonly used pultrusion processes used to produce reinforced composites can be employed in the present invention. Typical pultrusion processes and equipment are described in U.S. Pat. Nos. 3,042,570; 3,608,033; 3,684,622; 3,742,107; 3,793,108; 3,960,629; 3,993,726; and 4,132,756, all incorporated herein by reference. Such a process is readily used to produce a continuous prepreg, roving, or tape. The crosshead die can either have a fixed exit slit, or more preferably, the entrance and exit can have flex lips attached to facilitate the increased pressure from the extruder to force the polymer melt into the carbon fiber tows. It has also been found that a narrow exit slit on the crosshead die (less than about 0.010 inch) facilitates the impregnation of a tape. Typical pressures developed within the crosshead die are about 100 psi or less.

In contrast to the sizing agents of the prior art, the polyamic size described above allows the multifilamentary bundles to spread like unsized fiber when pulled over a bar. Thus the bundle spreads out allowing the bundle to enter the crosshead die as a uniform band.

One method of increasing the impregnation of the fibers is to employ nip rolls subsequent to passage of the fibers through the crosshead die. The nip rolls are more effective when located very close, i.e. about one to three inches, to the exit of the die thereby allowing the rolls to compress the tape while the thermotropic liquid crystalline polymer is still in the melt state. Care must be taken to maintain the nip roll surface temperature below the melting point of the thermotropic liquid crystalline polymer in order to avoid sticking of the polymer to the rolls.

One means of testing the coupling between the fiber and the matrix is to test the shear strength of the composite. The preferred test for shear strength is the compression lap shear test (ASTM D3846).

The tape that results from the crosshead die and extruder described above has a uniform distribution of carbon fibers throughout with only minimal residual formation of the original multifilamentary bundles. The resulting tape can be cut into pieces for forming multiple plies which can be combined and placed in a mold. The temperature of the plies is raised to at least the melting temperature of the thermotropic liquid crystalline polymer and preferably 20°–40° C. above the melting temperature (about 250°–400° C.). While above the melting temperature, pressure is applied to form the composite part, typically about 75–1000 psi. Pressure is preferably maintained for a period of about 5 to about 30 minutes, the formed part is cooled while maintained under pressure, after which it is removed from the mold below the melt temperature of the polymer.

While not wishing to be bound by theory, it is believed that free amine on the size may react with the ester groups of the preferred thermotropic liquid crystalline polymer to produce chemical bonding in addition to the mechanical bonds between the sized fibers and the matrix. It is believed that this combination of chemical and mechanical bonding contributes to the unexpected desirable mechanical properties of the product of the present invention.

The sized carbon fiber loading in the present invention can vary between about 35 and about 75 percent by volume, and more preferably between about 50 and about 65 percent. Because of the relatively uniform distribution of fibers, it is not necessary to use as much fiber as is typically required in composites of the prior art.

In order to further illustrate the present invention and the advantages thereof, the following specific examples are given, it being understood that they are intended only to be illustrative without limiting the scope of the present invention.

Typical Preparation Of The Size And Coating Of The Carbon Fiber

The carbon fiber selected for sizing was a yarn of carbonaceous filamentary material derived from an acrylonitrile copolymer consisting of approximately 98 mole percent of acrylonitrile units and 2 mole percent methylacrylate units. The carbonaceous material consisted of approximately 6000 substantially parallel filaments, contained approximately 93 percent carbon by weight, and was commercially available from the Celanese Corporation under the designation of Celion 6000. Representative average filament properties for the carbon fiber were a denier of 0.6, a tensile strength of approximately 470,000 psi, a Young's modulus of approximately 34 million psi, and an elongation of approximately 1.4 percent.

To vessel No. 1 were added, at room temperature with stirring, 173.4 parts by weight of N-methyl pyrrolidone, 11.3 parts by weight of p-phenylenediamine, and 0.6 parts by weight of m-phenylenediamine. The p-phenylenediamine and the m-phenylenediamine were dissolved in the N-methyl pyrrolidone solvent. While stirring continued, 27.3 parts by weight of 3,3',4,4'-benzophenonetetracarboxylic dianhydride were slowly added and the temperature was allowed to rise to a maximum of approximately 40° C. Stirring continued until the benzophenonetetracarboxylic dianhydride as well as all other components were completely dissolved.

To vessel No. 2 were added, at room temperature with stirring, 25 parts by weight of N-methyl pyrrolidone and 8.31 parts by weight of 3,3',4,4'-benzophenonetetracarboxylic dianhydride. The temperature was raised to 70° C. and stirring continued When all of the 3,3',4,4'-benzophenonetetracarboxylic dianhydride had dissolved, 2.4 parts by weight of absolute ethyl alcohol were added to the heated solution. A cover was placed over vessel No. 2 to prevent evaporation of the ethyl alcohol, and the temperature was raised to 80° C. and held at that temperature for 30 minutes. This solution which contained the dissolved 3,3'-diethylester of 3,3',4,4'-benzophenonetetracarboxylic acid as a reaction product was cooled to room temperature.

The solution from vessel No. 2 was added to vessel No. 1 with stirring while the contents of vessel No. 1 were at room temperature. The resulting concentrated mixture contained 20.1 percent by weight solids dissolved therein, and was stored under refrigeration until diluted for application as a size or finish to the carbon fibers.

A portion of the concentrated mixture next was diluted with additional N-methyl pyrrolidone and with acetone to form the size solution which was applied to the carbon fibers. The resulting solvent mixture was composed of 70 percent by weight acetone, and 30 percent by weight N-methyl pyrrolidone and the size components were present therein in a concentration of 0.9 percent by weight based upon the total weight of the solution. More specifically, 100 parts by weight of the concentrated mixture were first mixed wih 548 parts by weight of N-methyl pyrrolidone and then 1549 parts by weight of acetone were next dropwise added while stirring to form the final sizing solution.

The resulting dilute size solution was applied to the carbon fiber within one day of its formation. The solution contained a film-forming polyamic acid oligomer which was formed primarily by the reaction of the p-phenylenediamine and the m-phenylenediamine with the 3,3',4,4'-benzophenonetetracarboxylic dianhydride. The 3,3'-diethylester of 3,3',4,4'-benzophenonetetracarboxylic acid present served primarily as an unreacted diluent which was capable of entering into the polyimide-forming reaction at more highly elevated temperatures. The presence of such reactive diluent served to limit the increase in viscosity resulting from the polyamic acid oligomer formation thereby preserving the desired flexibility of the size coating.

More specifically, the sizing of the continuous length of the carbon fibers was accomplished while being dipped within and being passed in the direction of its length at a rate of 5 meters per minute through a metal trough containing the sizing solution at room temperature.

The solvent next was removed from the surface of the carbon fibers by drying for a residence time of two minutes in a circulating air oven provided at 150° C. A flexible coating was provided on the surface of the carbon fiber in a concentration of 0.6 percent by weight, which imparted highly improved handling characteristics to the carbon fibers while significantly reducing the fuzz level. A very small amount of N-methyl pyrrolidone was present within this resulting size coating but did not significantly reduce the properties of the composite article ultimately produced.

EXAMPLE

The carbon fibers coated with size described above were utilized in making a prepreg tape. The thermotropic liquid crystalline polymer selected was derived from 60 mole percent 6-acetoxy-2-naphthoic acid, 20 mole percent terephthalic acid, and 20 mole percent hydroquinone diacetate, the production of which is set forth in U.S. Pat. No. 4,256,624. The inherent viscosity of the polymer was about 3.5 dl./g. when dissolved in a concentration of 0.1 percent by weight in pentafluorophenol at 60° C. and the DSC melting point was about 285° C. The sized carbon fibers were pulled horizontally through the cross-head die, the die being connected to an extruder containing the thermotropic liquid crystalline polymer melt. The entrance and exit slits were three inches wide with a thickness which typically varied between about 0.008 and about 0.020 inch. The temperature of the die was about 620° F., the take off was about 10 feet per minute, with the melt pressure being about 20 psi. Nip rolls set to apply a pressure of about 120 pli (pounds/linear inch) were located about 1.5 inches from the exit of the crosshead die. A loading of between about 55 and about 60 volume percent fiber was obtained.

The resulting 0.012 inch thick tape was cut into sections of three by 10.5 inches and then the desired number of plies were molded using a mold temperature of about 315° C., a molding time of approximately 30 minutes, and a pressure of about 200 psi, after which the molds were cooled and the composites were removed from the molds for testing. All testing was done at room temperature. Tensile, compression, and transverse flex tests were performed on the samples. The samples for the transverse flex tests employed 15 plies producing a thickness of about 0.120 inch; the samples for the compression tests employed 6 plies for a thickness of about 0.040 inch; and the samples for the tensile tests employed 4 plies for a thickness of about 0.030 inch. Each of the tests are well-known to those skilled in the art, the tensile test being ASTM D-3039, the compression test being ASTM D-695, and the transverse flex test being ASTM D-790. The results of the tests are shown in Table I below wherein the fiber loading is indicated in volume percent (V%).

TABLE 1

| TENSILE | |
|---|---|
| STRENGTH | 196 KSI |
| MODULUS | 20 MSI |
| ELONGATION | 1.04 % |
| FIBER LOADING | 62 V % |
| COMPRESSION | |
| STRENGTH | 80 KSI |
| FIBER LOADING | 56 V % |
| TRANSVERSE FLEX | |
| STRENGTH | 3 KSI |
| MODULUS | 700 KSI |
| FIBER LOADING | 58 V % |

Although the invention has been described in terms of various preferred embodiments, one skilled in the art will appreciate that various modifications, substitutions, omissions, and changes may be made without departing from the spirit thereof. Accordingly, it is intended that the scope of the present invention be limited solely by the scope of the following claims.

What is claimed is:

1. A composite structure comprising a thermotropic liquid crystalline polymer matrix having carbon fibers incorporated therein, the carbon fibers having been coated on their surface with a sizing composition comprising a rigid polyimide coating which is derived from the reaction of at least one aromatic diamine, at least one aromatic dianhydride, and at least one aromatic tetracarboxylic acid diester in which the carboxylic acid groups and ester groups are ortho disposed, wherein a polyamic acid oligomer is formed as an intermediate during the formation of the rigid polyimide coating and is present within a flexible coating comprising the reactants which facilitates impregnation of the coated carbon fibers with the matrix during the formation of the composite structure.

2. The composite structure of claim 1 wherein the rigid polyimide coating is present in a concentration of approximately 0.3 to 5.0 percent based upon the weight of the carbon fibers.

3. The composite structure of claim 1 wherein the rigid polyimide coating is present in a concentration of approximately 0.5 to 1.3 percent by weight based upn the weight of the carbon fibers.

4. The composite structure of claim 1 wherein the rigid polyimide coating is derived from the reaction of approximately 50 mole percent of the at least one aromatic diamine, approximately 30 to 40 mole percent of the at least one aromatic dianhydride, and approximately 10 to 20 mole percent of the at least one aromatic tetracarboxylic acid diester wherein the carboxylic acid groups and ester groups are ortho disposed.

5. The composite structure of claim 1 wherein the aromatic diamine is selected from the group consisting of p-phenylenediamine, m-phenylenediamine, 4,4'-oxydianiline, 4-4'-methylenedianiline, 4,4'-diaminodiphenylsulfone, 4,4'-diaminobenzophenone, 4,4'-diaminobiphenyl, 3,3'-diaminodiphenylsulfone, 3,3'-diaminobenzophenone, and mixtures of the foregoing.

6. The composite structure of claim 1 wherein said aromatic diamine is a mixture of approximately 95 percent by weight p-phenylenediamine and approximately 5 percent by weight m-phenylenediamine.

7. The composite structure of claim 1 wherein the aromatic dianhydride is 3,3',4,4'-benzophenonetetracarboxylic dianhydride, pyromellitic dianhydride, 3,3',4,4'-(hexafluoroisopropylidene)bis(phthalic anhydride), and mixtures of the foregoing.

8. The composite structure of claim 1 wherein the aromatic dianhydride is 3,3',4.4'-benzophenonetetracarboxylic dianhydride.

9. The composite structure of claim 1 wherein said aromatic tetracarboxylic acid diester is formed by the reaction of an aromatic dianhydride and an alcohol having one to six carbon atoms.

10. The composite structure of claim 9 wherein the alcohol is ethanol.

11. The composite structure of claim 1 wherein the aromatic tetracarboxylic acid diester is the 3,3'-diethylester of 3,3',4,4'-benzophenonetetracarboxylic acid, the 3,3'-diethylester of 3,3',4,4'-(hexafluoroisopropylidene)-bis-(phthalic acid), the 1,5-diethylester of pyromellitic acid, and mixtures of the foregoing.

12. The composite structure of claim 1 wherein the aromatic tetracarboxylic acid diester is the 3,3'-diethylester of 3,3',4,4'-benzophenonetetracarboxylic acid 13. The composite structure of claim 1 wherein the thermotropic liquid crystalline polymer has an inherent viscosity of between about 1 and about 15.0 dl./g. when dissolved in a concentration of 0.1 percent by weight in pentafluorophenol at 60° C.

14. The composite structure of claim 1 wherein the rigid polyimide coated carbon fibers are present in the composite structure at between about 35 and about 75% by volume.

15. The composite structure of claim 1 wherein the rigid polyimide coated carbon fibers are present in the composite structure at between about 50 and about 65% by volume.

16. The composite structure of claim 1 wherein the thermotropic liquid crystalline polymer is selected from the group consisting of a wholly aromatic polyester, an aromatic-aliphatic polyester, an aromatic-aliphatic poly(ester-amide), an aromatic polyazomethine, and an aromatic polyester-carbonate.

17. The composite structure of claim 1, wherein the thermotropic liquid crystalline polymer is selected from the group consisting of a wholly aromatic polyester, a wholly aromatic poly (ester-amide), and an aromatic-aliphatic poly(ester-amide).

18. The composite structure of claim 1, wherein the thermotropic liquid crystalline polymer is a melt processable poly(ester-amide) capable of forming an anisotropic melt phase at a temperature below approximately 400° C. consisting essentially of recurring moieties I, II, III, and, optionally, IV wherein:

I is

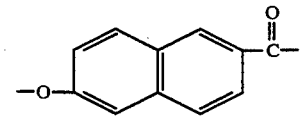

II is

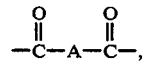

where A is a divalent radical comprising at least one aromatic ring or a divalent trans-1,4-cyclohexylene radical;

III is —Y—A—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

19. The composite structure of claim 1, wherein the thermotropic liquid crystalline polymer is a melt processable wholly aromatic polyester capable of forming an anisotropic melt phase at a temperature below approximately 400° C. consisting essentially of the recurring moieties I, II, and III which may include substitution of at least some of the hydrogen atoms present upon an aromatic ring wherein:

I is

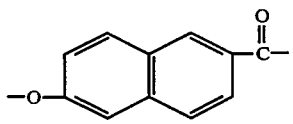

II is a dioxy aryl moiety of the formula —O—Ar—O— where Ar is a divalent radical comprising at least one aromatic ring, and III is a dicarboxy aryl moiety of the formula

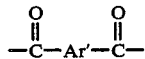

where Ar' is a divalent radical comprising at least one aromatic ring,
with said optional substitution if present being selected from the group consisting of an alkyl group of 1 to 4 carbon atoms, an alkoxy group of 1 to 4 carbon atoms, halogen, a phenyl group and mixtures of the foregoing, and wherein said polyester comprises approximately 10 to 90 mole percent of moiety I, approximately 5 to 45 mole percent of moiety II, and approximately 5 to 45 mole percent of moiety III.

20. The composite structure of claim 1, wherein the thermotropic liquid crystalline polymer is a melt processable wholly aromatic polyester capable of forming a thermotropic melt phase at a temperature below approximately 350° C. consisting essentially of the recurring moieties I and II which may include substitution of at least some of the hydrogen atoms present upon an aromatic ring wherein:

I is

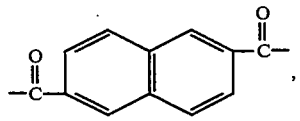

and
II is

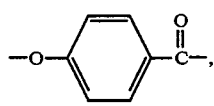

with said optional substitution if present being selected from the group consisting of an alkyl group of 1 to 4 carbon atoms, an alkoxy group of 1 to 4 carbon atoms, halogen, and mixtures of the foregoing, and wherein said polyester comprises approximately 10 to 90 mole percent of moiety I, and approximately 10 to 90 percent of moiety II.

21. A prepreg comprising a thermotropic liquid crystalline polymer matrix having carbon fibers incorporated therein, the carbon fibers having been coated on their surface with a sizing composition comprising a rigid polyimide coating which is derived from the reaction of at least one aromatic diamine, at least one aromatic dianhydride, and at least one aromatic dianhydride, and at least one aromatic tetracarboxylic acid diester in which the carboxylic acid groups and ester groups are ortho disposed, wherein a polyamic acid oligomer is formed as an intermediate during the formation of the rigid polyimide coating and is present within a flexible coating comprising the reactants which facilitates impregnation of the coated carbon fibers with the matrix during the formation of the prepreg.

22. The prepreg of claim 21 wherein the rigid polyimide coating is present in a concentration of approximately 0.3 to 5.0 percent based upon the weight of the carbon fibers.

23. The prepreg of claim 21 wherein the rigid polyimide coating is present in a concentration of approximately 0.5 to 1.3 percent by weight based upon the weight of the carbon fibers.

24. The prepreg of claim 21 wherein the rigid polyimide coating is derived from the reaction of approximately 50 mole percent of the at least one aromatic diamine, approximately 30 to 40 mole percent of the at least one aromatic dianhydride, and approximately 10 to 20 mole percent of the at least one aromatic tetracarboxylic acid diester wherein the carboxylic acid groups and ester groups are ortho disposed.

25. The prepreg of claim 21 wherein the aromatic diamine is selected from the group consisting of p-phenylenediamine, m-phenylenediamine, 4,4'-oxydianiline, 4-4'-methylenedianiline, 4,4'-diaminodiphenylsulfone, 4,4'-diaminobenzophenone, 4,4'-diaminobiphenyl, 3,3'-diaminodiphenylsulfone, 3,3'-diaminobenzophenone, and mixtures of the foregoing.

26. The prepreg of claim 21 wherein said aromatic diamine is a mixture of approximately 95 percent by weight p-phenylenediamine and approximately 5 percent by weight of m-phenylenediamine.

27. The prepreg of claim 21 wherein the aromatic dianhydride is 3,3',4,4'-benzophenonetetracarboxylic dianhydride, pyromellitic dianhydride, 3,3',4,4'-(hexafluoroisopropylidene)bis(phthalic anhydride), and mixtures of the foregoing.

28. The prepreg of claim 21 wherein the aromatic dianhydride is 3,3',4,4'-benzophenonetetracarboxylic dianhydride.

29. The prepreg of claim 21 wherein said aromatic tetracarboxylic acid diester is formed by the reaction of an aromatic dianhydride and an alcohol having one to six carbon atoms.

30. The prepreg of claim 29 wherein the alcohol is ethanol.

31. The prepreg of claim 21 wherein the aromatic tetracarboxylic acid diester is the 3,3'-diethylester of 3,3',4,4'-benzophenonetetracarboxylic acid, the 3,3'-diethylester of 3,3',4,4'-(hexafluoroisopropylidene)bis-(phthalic acid), the 1,5-diethylester of pyromellitic acid, and mixtures of the foregoing.

32. The prepreg of claim 21 wherein the aromatic tetracarboxylic acid diester is the 3,3'-diethylester of 3,3',4,4'-benzophenonetetracarboxylic acid.

33. The prepreg of claim 21 wherein the thermotropic liquid crystalline polymer has an inherent viscosity of between about 1 and about 15.0 dl./g. when dissolved in a concentration of 0.1 percent by weight in pentafluorophenol at 60° C.

34. The prepreg of claim 21 wherein the rigid polyimide coated carbon fibers are present in the prepreg at between about 35 and about 75% by volume.

35. The prepreg of claim 21 wherein the rigid polyimide coated carbon fibers are present in the prepreg at between about 50 and about 65% by volume.

36. The prepreg of claim 21 wherein the thermotropic liquid crystalline polymer is selected from the group consisting of a wholly aromatic polyester, an aromatic-aliphatic polyester, an aromatic-aliphatic poly(ester-amide), an aromatic polyazomethine, and an aromatic polyester-carbonate.

37. The prepreg of claim 21, wherein the thermotropic liquid crystalline polymer is selected from the group consisting of a wholly aromatic polyester, a wholly aromatic poly(ester-amide), and an aromatic-aliphatic poly(ester-amide).

38. The prepreg of claim 21, wherein the thermotropic liquid crystalline polymer is a melt processable poly(ester-amide) capable of forming an anisotropic melt phase at a temperature below approximately 400° C. consisting essentially of recurring moieties I, II, III, and, optionally, IV wherein I is

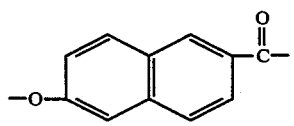

II is

where A is a divalent radical comprising at least one aromatic ring or a divalent trans-1,4-cyclohexylene radical;

III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

39. The prepreg of claim 21, wherein the thermotropic liquid crystalline polymer is a melt processable wholly aromatic polyester capable of forming an anisotropic melt phase at a temperature below approximately 400° C. consisting essentially of the recurring moieties I, II, and III which may include substitution of at least some of the hydrogen atoms present upon an aromatic ring wherein:

I is

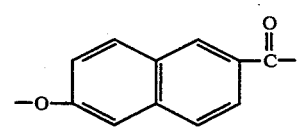

II is a dioxy aryl moiety of the formula —O—Ar—O— where Ar is a divalent radical comprising at least one aromatic ring, and III is a dicarboxy aryl moiety of the formula

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, a phenyl group and mixtures of the foregoing, and wherein said polyester comprises approximately 10 to 90 mole percent of moiety I, approximately 5 to 45 mole percent of moiety II, and approximately 5 to 45 mole percent of moiety III.

40. The prepreg of claim 21, wherein the thermotropic liquid crystalline polymer is a melt processable wholly aromatic polyester capable of forming a thermotropic melt phase at a temperature below approximately 350° C. consisting essentially of the recurring moieties I and II which may include substitution of at least some of the hydrogen atoms present upon an aromatic ring wherein:

I is

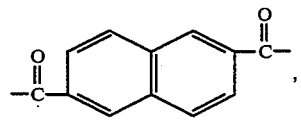

and

II is

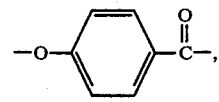

with said optional substitution if present being selected from the group consisting of an alkyl group of 1 to 4 carbon atoms, an alkoxy group of 1 to 4 carbon atoms, halogen, and mixtures of the foregoing, and wherein said polyester comprises approximately 10 to 90 mole percent of moiety I, and approximately 10 to 90 percent of moiety II.

* * * * *